United States Patent [19]
Anahara et al.

[11] Patent Number: 5,173,358
[45] Date of Patent: Dec. 22, 1992

[54] THREE-DIMENSIONAL FABRIC

[75] Inventors: Meiji Anahara; Yoshiharu Yasui, both of Kariya, Japan

[73] Assignees: Kabushiki Kaisha Toyoda Jidoshokki Seisakusho, Kariya; Fuji Jukogyo Kabushiki Kaisha, Tokyo; Kawasaki Jukogyo Kabushiki Kaisha, Kobe, all of Japan

[21] Appl. No.: 749,885

[22] Filed: Aug. 26, 1991

[30] Foreign Application Priority Data

Aug. 27, 1990 [JP] Japan ................................. 2-225999

[51] Int. Cl.$^5$ ............................................. D03D 3/00
[52] U.S. Cl. .................................... 428/224; 428/105; 428/222; 428/223; 428/225; 428/257; 428/365
[58] Field of Search ............... 428/257, 224, 225, 222, 428/223, 365, 105

[56]  References Cited
U.S. PATENT DOCUMENTS 4,366,658  1/1983  Maistre ................................. 428/105
5,024,874  6/1991  Yasui ..................................... 428/225

FOREIGN PATENT DOCUMENTS 0426878  5/1991  Japan .

*Primary Examiner*—James J. Bell
*Attorney, Agent, or Firm*—Brooks Haidt Haffner & Delahunty

[57] ABSTRACT

A three-dimensional fabric is disclosed that effectively weaves a solid member into the fabric. A multiplicity of warp strings that are arranged in a plurality of layers which extend in a lengthwise direction of the fabric. At least some of the warp strings are wrapped around the solid member. A multiplicity of bias threads are arranged in at least one symmetrical pair of bias thread layers. The bias threads are incline relative to the lengthwise direction of the fabric and the layers in the bias layer pair are symmetrically arranged relative to the lengthwise direction of the fabric. At least some of the bias threads are wrapped around the solid member. A plurality of vertical threads are provided that run substantially perpendicular relative to the warp string and the bias thread layers. The vertical threads couple the layers of the warp strings and the bias threads. In the case where the three-dimensional fabric is used as a composite, which is coupled to another member when in use, it is unnecessary to perform any mechanical processing after the composite is completed to attach a coupling part, such as a metal bushing, to the fabric.

4 Claims, 19 Drawing Sheets

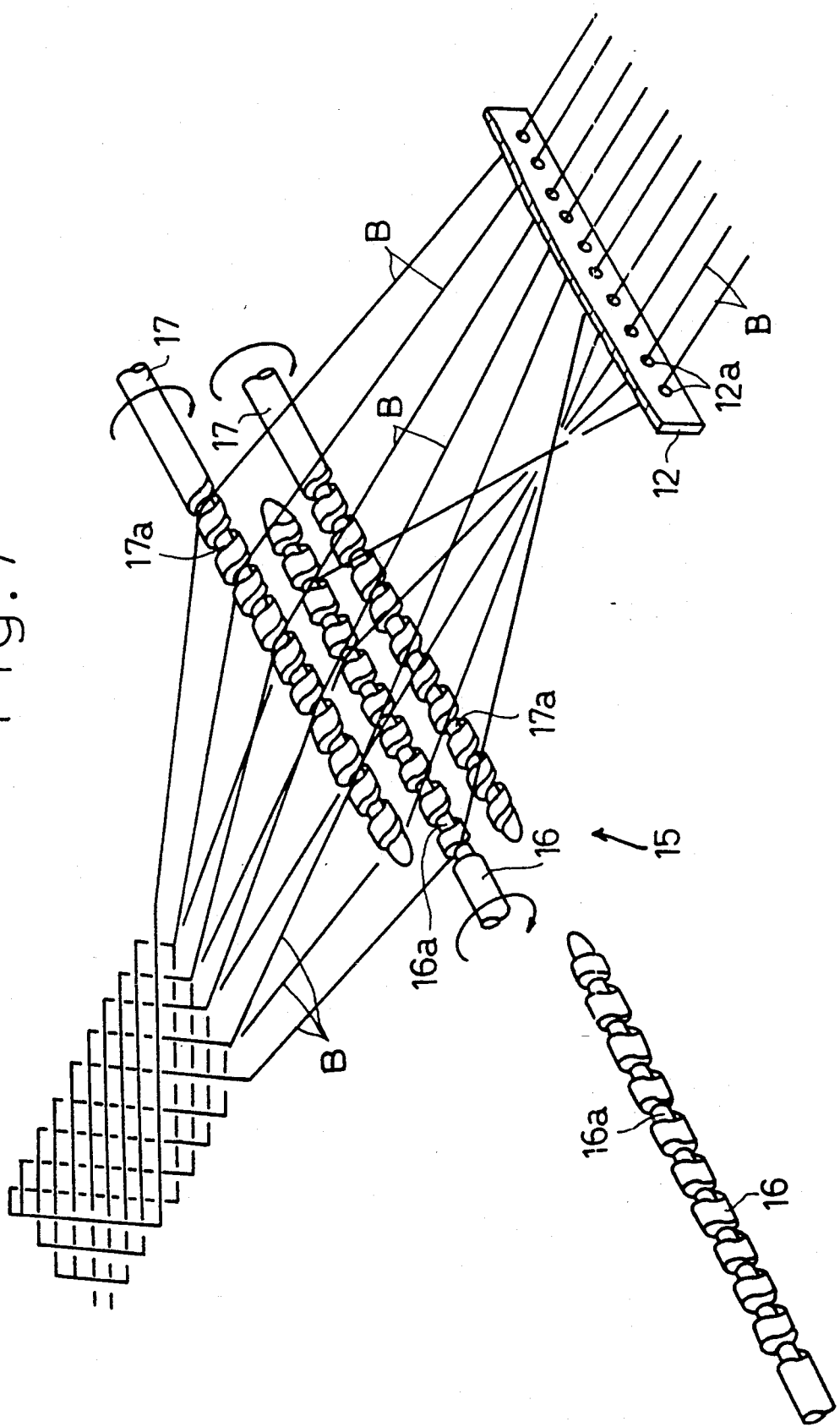

THREE-DIMENSIONAL FABRIC

BACKGROUND OF THE INVENTION

1. Field of the Invention

The present invention relates to a three-dimensional fabric, and more particularly to a three-dimensional fabric suitable for use as a frame member of a composite that is to be coupled to another member.

2. Description of the Related Art

Composite materials having a three-dimensional fabric that includes three kinds of threads are expected to be widely used as structural materials for rockets, aircraft, automobiles, marine vessels and buildings. Such fabrics include a multiplicity of warp strings extended in multiple columns and rows. Vertical threads and wefts are then woven perpendicularly in between various columns and rows of the warp strings. The fabric is used as a core and impregnated with matrix of a resin or an inorganic substance. To widely use composites of this type, it is necessary that individual members can be coupled together like general metal structural materials.

One conventional composite material has a frame composed of multiple laminated cloths. Conventionally, to couple such frame members, a hole is bored in a composite 60. A metal bushing 61 is inserted in that hole, and this composite 60 is coupled to another composite 60 or another structural member 62 by means of a bolt 63 and a nut 64, as shown in FIG. 20. In the case where composites employing a three-dimensional fabric as the frame member are coupled together by means of a bolt and a nut or a pin, it has likewise been conventionally necessary to form a hole in each composite and insert a metal bushing in the hole.

A similar approach could be used when three-dimensional fabrics are used as the frame material. That is, a hole 65 may be formed in the composite to receive a metal bushing. However, this requires actually cutting the yarns that constitute the portion of the three-dimensional fabric F that corresponds to the hole 65, as shown in FIG. 21. This reduces the strength of that portion (specially the strength against the force in the direction of the arrow). Accordingly, the length L and width W of that portion must be relatively large in order to increase the strength of the cut portion. This increases the volume of the portion surrounding the metal bushing 61, which is undesirable. Further, the hole 65 is typically bored after forming the composite. Therefore, minute cracks or the like may occur in the fabric depending on how the hole is finished. These minute cracks may damage the composite due to the concentration of stress. It is therefore difficult to predict the strength of the coupling portion in the stage of designing of the three-dimensional fabric.

In the case where a three-dimensional fabric comprises only the threads (fibers) extending in the three perpendicular axes of X, Y and Z, composites using this three-dimensional fabric as the frame member are strong enough against tensile loads acting in the individual directions. Since there are no fibers in an inclined direction to the lengthwise direction of the fabric, however, the amount of deformation of the three-dimensional fabric caused by the force acting in the inclined direction with respect to the axial direction is great. The three-dimensional fabric therefore tends to become weaker against the compressive loads than the tensile loads.

SUMMARY OF THE INVENTION

It is therefore an object of the present invention to provide a three-dimensional fabric for a coupling member, which can enhance the strength of a coupling portion without increasing the volume of the coupling portion.

Another objective is to provide a three-dimensional fabric for a coupling member which has good hardness or durability against the tensile loads and compressive loads which would act on the fabric.

Another objective is to provide a three-dimensional fabric for a coupling member which accommodates prediction of the strength of the coupling portion in the stage of designing of the three-dimensional fabric.

To achieve these objects, the three-dimensional fabric embodying the present invention includes a solid member effectively woven into the fabric. A multiplicity of warp strings that are arranged in a plurality of layers extend in a lengthwise direction of the fabric. At least some of the warp strings being wrapped around the solid member. A multiplicity of bias threads are arranged in at least one symmetrical pair of bias thread layers. The bias threads are incline relative to the lengthwise direction of the fabric and the layers in the bias layer pair are symmetrically arranged relative to the lengthwise direction of the fabric. At least some of the bias threads are wrapped around the solid member. A plurality of vertical threads are provided that run substantially perpendicular relative to the warp string and the bias thread layers. The vertical threads couple the layers of the warp strings and the bias threads.

With this arrangement, it is unnecessary to bore a hole for insertion of the solid member after forming the composite. Accordingly, the strength at the coupled portion will not be lowered due to the concentration of stress caused by minute cracks which are made in the hole opening process. This facilitates the prediction of the strength of the coupling portion in the stage of designing of the three-dimensional fabric. In the case where three-dimensional fabric is used as a composite, the tensile force and compressive force acting on the solid member can be transmitted to all the warp strings z and bias threads which are wound around the solid member. These loads can therefore be well distributed, and all the warp strings z and bias threads wound around the solid member contribute to increasing the strength at the coupling portion and thus permits more compact designs for the portion of the fabric around the solid member which serves as the coupling portion. In particular, it is possible to improve the strength (durability) against compressive loads, which is generally considered a weak point or disadvantage of composites.

In a preferred embodiment, the solid member, which may take the form of a metal bushing, is located at the end portion of the fabric. Additionally, radially extending threads may be woven through the warp strings and bias threads wrapped around the solid member. Such a structure improves the strength of the portion surrounding the solid member when complicated loads are applied to the solid member.

In another preferred embodiment, a plurality of vertically extending threads are provided that extend substantially perpendicular to and between selected bias and warp string that are wrapped about the solid member. Again this further increases the strength of the portion surrounding the solid member.

The warp strings or bias threads which are to be wound around the solid member may be wound around the entire outer surface of the solid member.

BRIEF DESCRIPTION OF THE DRAWINGS

FIG. 7 is a schematic perspective view of the essential part of a bias thread feeding device;

DETAILED DESCRIPTION OF THE PREFERRED EMBODIMENTS

First Embodiment

The first preferred embodiment of the present invention will now be described referring to FIGS. 1 through 8.

Figure 1:
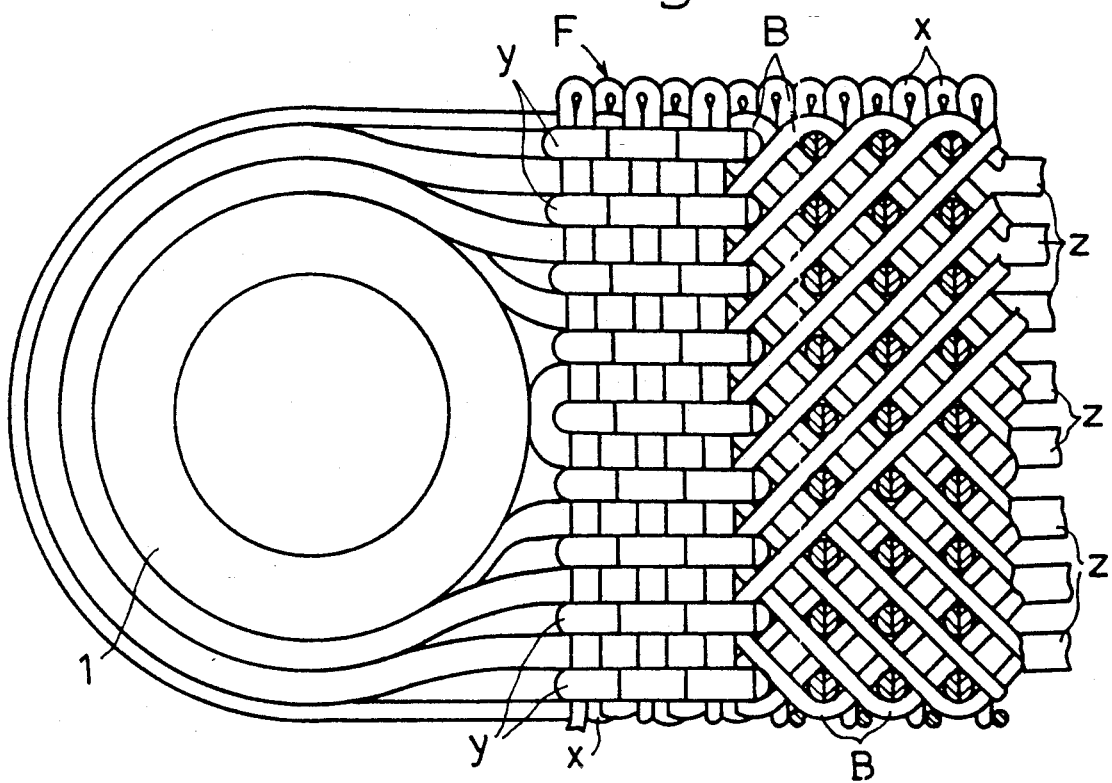
FIG. 1 is a partially broken away plan view of a three-dimensional fabric according to the first embodiment of the present invention.
Figure 2:
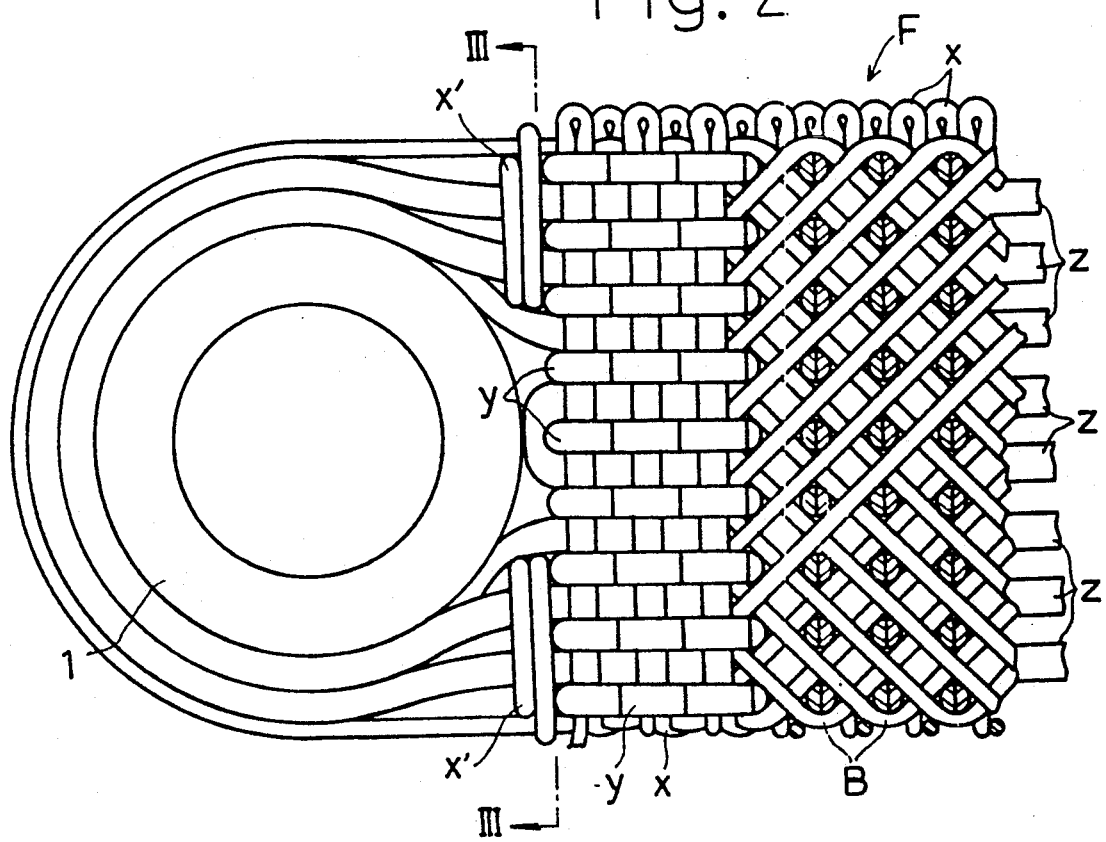
FIG. 2 is a partially broken away plan view of the three-dimensional fabric with additional weft x' included.

As shown in FIGS. 1 and 2, a three-dimensional fabric F includes a warp matrix, multiple vertical threads y, a plurality of bias thread layers and wefts x. The warp layer has a multiplicity of warp strings z stretched in multiple columns and multiple rows (eight columns and four rows in this embodiment). The vertical threads y are woven perpendicular to the warp strings z in between adjacent columns. Thus, the vertical threads y are arranged in a vertical direction relative to the fabric such that they are continuous for the individual columns. Each bias thread layer has a plurality of bias threads B arranged like a sheet. The bias thread layers are arranged in paired sets that are positioned between adjacent rows of the warp strings z. The layers are symmetrically aligned with respect to the lengthwise direction of the fabric in a plane parallel to the warp layer. The wefts x extend continuously in the widthwise direction of the fabric between the warp layer and the bias thread layer. The wefts x run perpendicular to the wrap strings z. In other words, the three-dimensional fabric F is a five-axis three-dimensional fabric acquired by coupling the threads of an in-plane four-axis fabric together by the vertical threads y. The number of the bias threads B in a bias thread layer set is twice as many as the number of the vertical threads y to be inserted in the width in which the layers of the bias threads B are folded back.

Each of the vertical threads y is vertically folded back from the upper portion of the three-dimensional fabric to form loops at ends and inserted to between two adjacent warp strings z. A weft string x is inserted as a selvage thread in the end loops of such vertical thread y in order to prevent the end loops from slipping. Each of the wefts x is folded to form an end loop and inserted through the end loops of vertical thread y. When rovings with little twist are used for each of the threads, wefts x and vertical threads y are individually inserted in a folded condition forming a loop at one end. With such an arrangement, the overlapped thread portions effectively form single string portions as shown in FIGS. 1 and 2.

A metal bushing 1 is arranged as a solid member at one end of the three-dimensional fabric F. Most of the warp strings z and the bias threads B are wound around the outer wall of the metal bushing 1. Since most of the warp strings z and the bias threads B are wound around the metal bushing 1 in a folded manner, therefore, approximately one half the number of the total warp strings z and bias threads B are wound around the metal bushing 1.

If a composite made from the thus-formed three-dimensional fabric F impregnated with a resin is coupled with another member at the metal bushing 1, loads acting on the metal bushing 1 are surely transmitted through the warp strings z and bias threads B to the body of the three-dimensional fabric F. When a compressive load is applied to the metal bushing 1, the bias threads B bear their share in force in the direction to endure the load. This permits the three-dimensional fabric to have good strength and improved performance as a coupling member. The coupling force of the wefts x significantly serves to prevent separation between the columns of the warp strings z to thereby improve that performance. Further, the vertical threads y couple individual layers of the warp strings z, wefts x and bias threads B to prevent the separation of one layer from another.

They also serve as a resistant force against forces applied in the axial direction of the metal bushing 1 and against impacts applied perpendicularly to the layer of the three-dimensional fabric. Since most of the warp strings z and bias threads B absorb stretching forces applied to the metal bushing 1, they effectively enhance the strength of the coupling portion.

The presence of the bias threads B arranged in the lengthwise direction inclined along the fabric reduce the amount of deformation originating from oblique forces, as compared with a composite having the conventional three-axis three-dimensional fabric as its frame member. While FIGS. 1 and 2 illustrate 8-column, 4-row warp strings z and two layers of bias threads B, the numbers of layers of the warp strings z and bias threads B are determined by the size and the required property of the composite that employs a three-dimensional fabric as its frame member.

Figure 3:
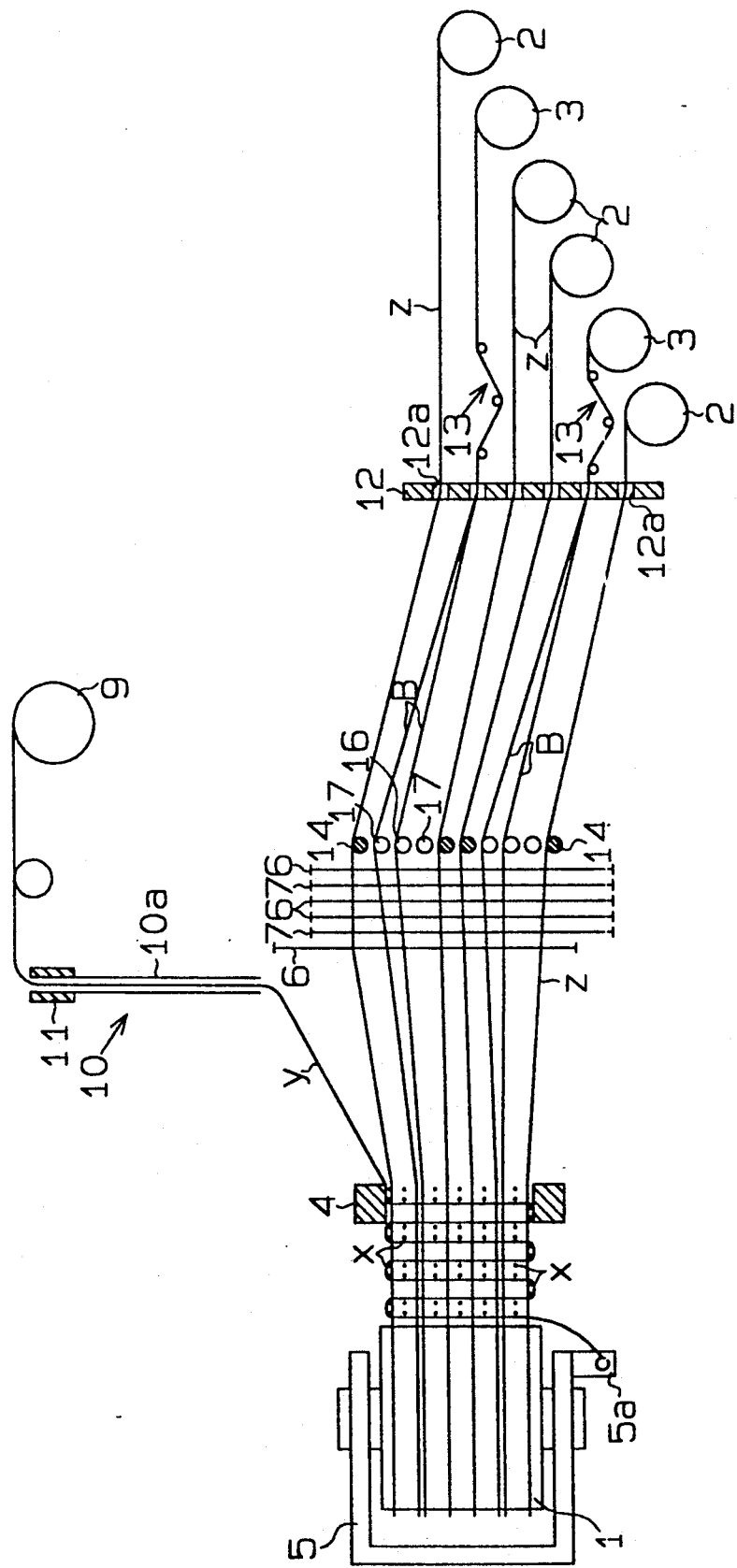
FIG. 3 is a schematic side elevational sectional view showing a weaving condition of the three-dimensional fabric.
Figure 4:
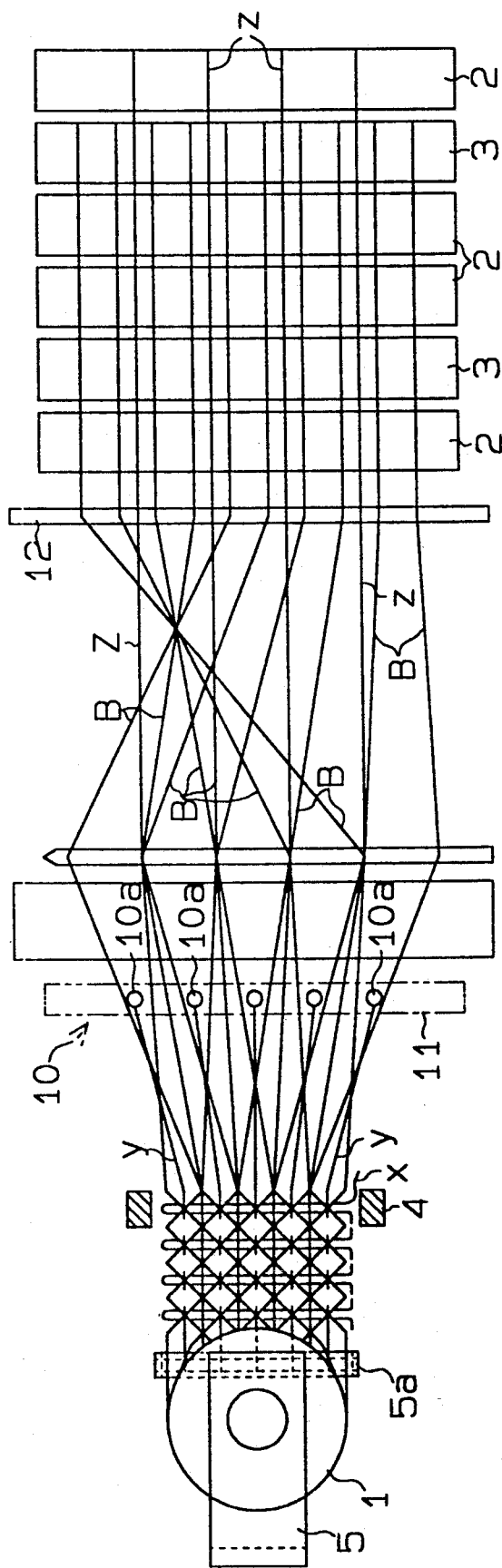
FIG. 4 is a schematic plan view of the same.

The method of weaving the three-dimensional fabric F will now be described. An apparatus for weaving such a three-dimensional fabric is shown in FIGS. 3 and 4. It includes, a warp supplying section and a bias thread supplying section. The warp supplying section includes a number of warp beams 2 corresponding to the number of the rows of the warp strings z. The bias thread supplying section includes a number of bias thread beams 3 which is equal to one half the number of the bias thread layers. Opposite the warp and bias thread supplying sections, a support member 5 is provided to support the metal bushing 1. A drive mechanism (not shown) is provided to move the support member 5 in a direction to draw up the three-dimensional fabric F (to the left in FIGS. 3 and 4), as weaving proceeds. A cloth fell frame 4 is disposed at a predetermined position in between the supplying sections 2, 3 and support member 5. Warp shedding devices 6 and bias thread shedding devices 7 are disposed to the rear of the cloth fell frame 4 (to the right in FIGS. 3 and 4).

Figure 5:
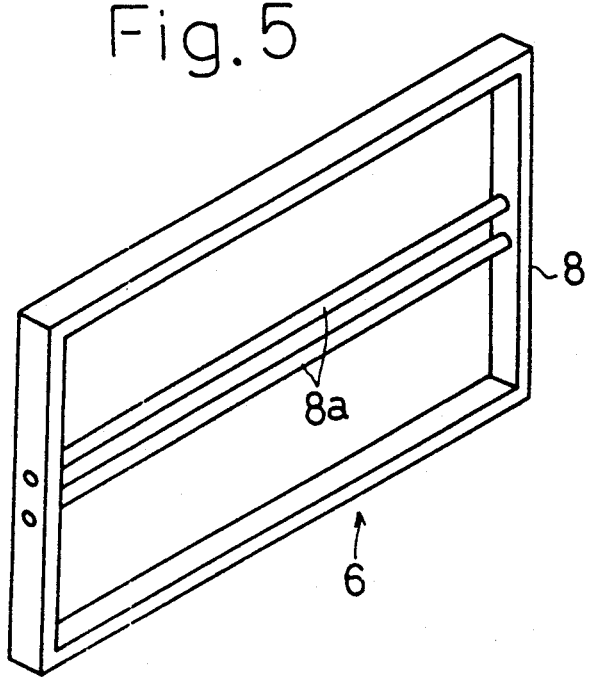
FIG. 5 is a schematic perspective view of a shedding device.

As shown in FIG. 5, each of the warp shedding devices 6 includes a frame 8 having a width greater than that of the three-dimensional fabric and a height greater than the thickness of the three-dimensional fabric. A pair of spaced apart guide rods 8a are secured to the frame 8. The spacing is sufficient to allow passage of the warp strings z therebetween. The warp shedding devices 6 are moved up and down by a driving mechanism (not shown). The bias thread shedding devices 7 are substantially similar in construction to the warp shedding device 6. The distance between the pair of guide rods is greater than that of the warp shedding device 6 so that the bias threads B do not contact guide rods when a bias thread feeding device (described later) operates.

Figure 6:
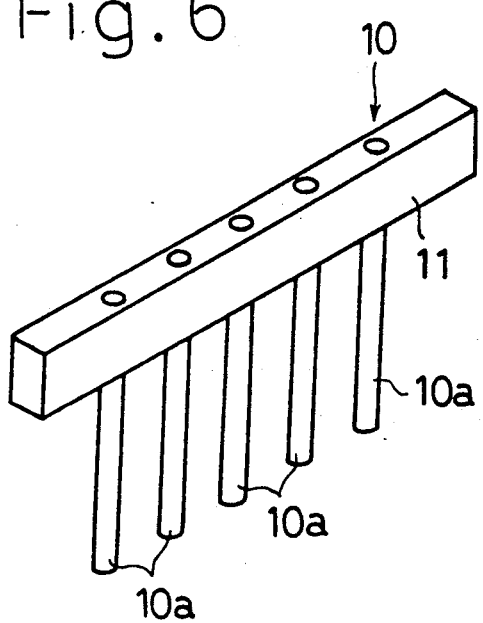
FIG. 6 is a schematic perspective view of a vertical thread rapier.

A vertical thread rapier 10 is disposed between the cloth fell frame 4 and the warp shedding devices 6 and acts to insert, upon upward and downward movement thereof, the vertical threads y drawn out from a vertical thread beam 9. As shown in FIG. 6, the vertical thread rapier 10 includes a support body 11 which is moved up and down by a driving mechanism (not shown), and a plurality of pipes 10a fitted in the support body 11. A predetermined number of vertical threads y are therefore simultaneously threaded in each column of the warp strings z. A guide plate 12 is disposed in front of the warp beams 2 and guides the warp strings z and the bias threads E drawn out from the warp beams 2 and the bias thread beams 3, respectively. The guide plate 12 has a plurality of guide holes 12a formed at locations corresponding to upper ends of the warp beams 2 and the bias thread beams 3 for guiding the warp strings z and the bias threads B one by one therethrough. Tension adjusting devices 13 (shown only in FIG. 3) are provided between the guide plate 12 and each of the bias thread beams 3 for each of the bias threads B drawn out from the bias thread beams 3.

Warp guides 14 and a bias thread feeding device 15 (corresponding to 16 and 17, respectively, in FIG. 3) shown in FIG. 7 are disposed behind the two shedding devices 6 and 7. The warp guides 14 are formed from rods which are disposed at predetermined locations. Each warp guide has guide grooves formed at a predetermined spaced relationship on the surface thereof. As shown in FIG. 7, the bias thread feeding device 15 includes two pairs of screw shafts 16 and 17, which have spiral grooves 16a and 17a respectively formed in the opposite directions. The two pairs of screw shafts 16 and 17 are disposed for individual movement between an operative position and a retracted position. In the operative position, the shafts 16 and 17 extend in parallel to the widthwise direction of the three-dimensional fabric and may individually engage the bias threads B. In the retracted position, the shafts 16 and 17 do not engage the bias threads B. The three screw shafts 16 and 17 are arranged so that they alternately face in the up and down directions.

The wefts x are inserted between adjacent rows of the warp strings z or between a row of warp strings z and a layer of the bias threads B. The end of each weft x is formed into a loop and inserted in a folded manner by a weft rapier 18 (shown in FIG. 9 (c) and (e)). The loop of the inserted weft x is temporarily fixed by the action of a press pin (not shown) which shifts up and down. When the sheds of the lower layer of warp strings z and the bias threads B, which sandwich the wefts x in that condition, are closed to compress the wefts x from both upward and downward sides, the wefts x are secured in the inserted state by the mutual friction between the threads. Thus, when the pin is pulled out to free the end loops, the wefts x hardly become loosen. If a selvage thread (not shown) is inserted through the each loops to hold the end loop, the wefts x can be secured more firmly.

The weaving of a three-dimensional fabric using the apparatus having the above-described structure will be described below.

Figure 8A:
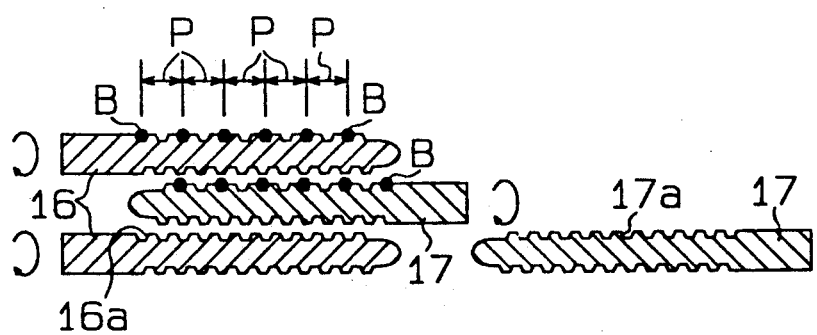
FIGS. 8 (a) to (h) are schematic sectional views illustrating the operation of the bias thread feeding device.
Figure 8B:
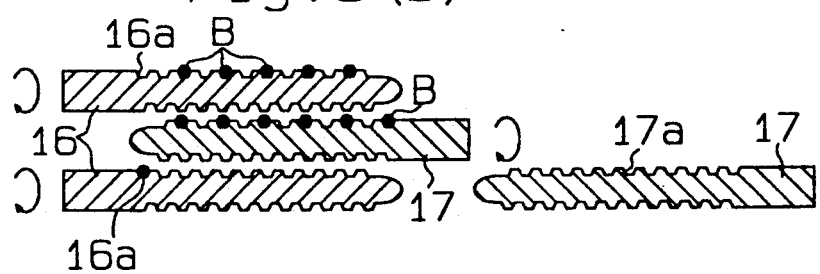

First, the feeding operation of the bias threads B by the bias thread feeding device 15 will be described. Three vertically spaced screw shafts 16 and 17 are provided such that they extend in the horizontal direction. Lateral movement of the bias threads B in the widthwise direction of the fabric is performed by rotating these screw shafts in the same direction. As shown in FIG. 8(a), an auxiliary screw shaft 17 is disposed at its retracted position coaxial with the screw shafts 16 at the lowest stage. The bias threads B are arranged to engage with the spiral grooves 16a and 17a of the screw shafts 16 and 17 located at the upper and middle stages, at a predetermined pitch P so as to be aligned on the vertical line. If the operative screw shafts 16 and 17 are rotated two rotations in the same direction, the bias threads B held in engagement with the screw shaft 16 at the upper stage will be moved one pitch P to the right. Meanwhile, the bias threads B held in engagement with the screw shaft 17 at the middle stage are moved by one pitch P to the left. At this point, the bias thread B held in engagement with the spiral groove 17a adjacent to a first end of the middle stage screw shaft 17 is released from that screw shaft 17 and is brought into contact with the spiral groove 16a adjacent to the base end of the lower stage screw shaft 16. Meanwhile, the bias thread B at a first end of the upper stage screw shaft 16 is transferred to the groove adjacent the base end portion of the middle stage screw shaft 17. This provides the condition shown in FIG. 8(b).

Figure 8C:
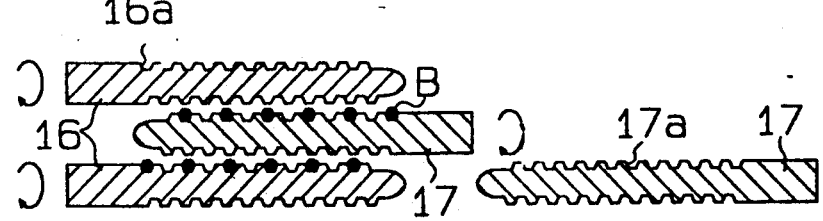
Figure 8D:
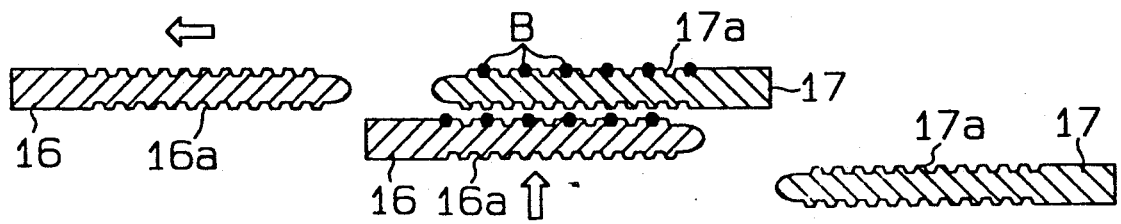
Figure 8:
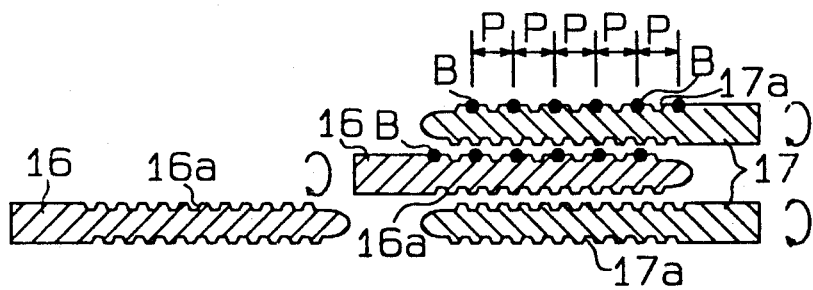
Figure 8:
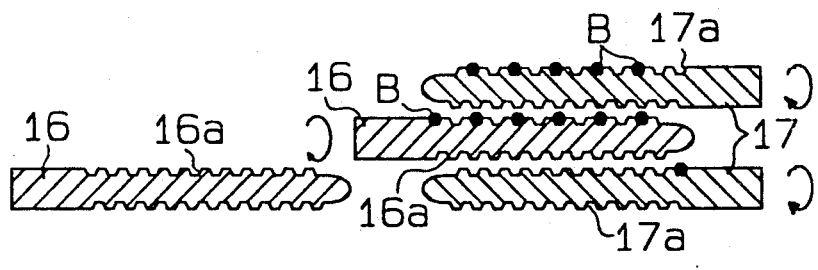
Figure 8:
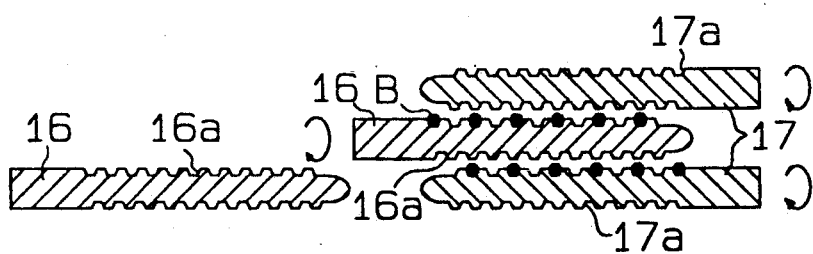
Figure 8:
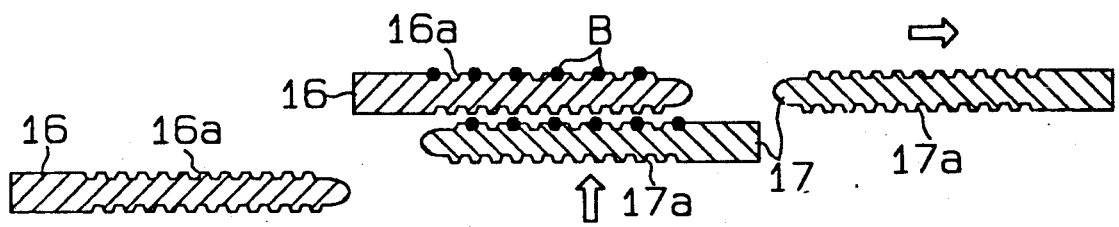

The operative screw shafts 16 and 17 are rotated to successively perform the lateral feeding of the bias threads B in a similar manner. The rotation continues until all of the bias threads B which had been in engagement with the middle stage screw shaft 17 in the condition shown in FIG. 8(a) are all transferred to the lower stage screw shaft 16. Meanwhile, the bias threads B initially carried by the upper stage screw shaft 16 are transferred to the middle stage screw shaft 17, thus providing the condition shown in FIG. 8(c). After all of the bias threads B carried by the upper stage screw shaft 16 are discharged, the upper stage screw shaft 16 is moved backward to its retracted position as shown in FIG. 8(d). At the same time, the middle stage screw shaft 17 and the lower stage screw shaft 16 are moved upward by one stage distance to the upper stage and the middle stages respectively. Then, the auxiliary screw shaft 17 which had been disposed in a retracted position at the lower stage is moved forward to the operative position of the lower stage. Meanwhile, the screw shaft 16 is moved downward from the retracted position at the upper stage to the retracted auxiliary position adjacent the lower stage as shown in FIG. 8(e).

After being shifted, the screw shafts 16 and 17 are rotated in the same direction. As described above, this causes the bias threads B carried by the screw shaft 16 now positioned at the middle stage to successively move to the right by one pitch of each two rotations. Thus, the treads are successively transferred to the screw shaft 17 located at the lower stage. Meanwhile, the bias threads B carried by the screw shaft 17 disposed at the upper stage are moved to the left while they are successively transferred to the screw shaft 16 disposed at the middle stage, resulting in the condition shown in FIG. 8(f). As the rotation of the screw shafts 16 and 17 continues, all of the bias threads B which have been in engagement with the upper stage screw shaft 17 are transferred to the screw shaft 16 positioned at the middle stage as shown in FIG. 8(g). Then, the screw shaft 17 at the upper stage is moved backward to its retracted position while the screw shaft 16 at the middle stage and the screw shaft 17 at the lower stage are shifted upward by one stage distance to the upper stage and the middle stage, respectively, as shown in FIG. 8(h). Then, the screw shaft 16 which has been located at the retracted position at the lower stage is now disposed to the operative position. The screw shaft 17 which has been located at the retracted position at the upper stage is moved downward to the retracted position at the lower stage, so that the condition shown in FIG. 8(a) is restored.

Thereafter, the lateral feeding operation of the bias threads B is performed successively in a similar manner. While the lengths of the bias threads B along routes thereof between the guide plate 12 and the cloth fell frame are varied to a great extent by the lateral feeding of the bias threads B, the tension of the bias threads B is kept substantially constant by the action of the tension adjusting devices 13.

The weaving procedure will now be described. First, a given number yarn strings are wound around the metal bushing 1 in a folded manner to provide the desired number of warp strings and bias threads. Both ends of the each strings that forms two warp string z are then inserted in the warp shedding devices 6. The warp strings z are then taken up on the appropriate warp beams 2 for each row (layer). Meanwhile, both ends of the strings used as the bias threads B are inserted in the bias thread shedding devices 7. The set of bias threads B are then taken up on the bias thread beams 3 for each set of the bias threads. Thereafter, the metal bushing 1 is securely attached to the supporting member 5 of the three-dimensional fabric weaving machine.

The ends of the vertical threads y are fed out from the vertical thread beams 9 and inserted in between the columns of the vertical thread rapier pipes 10a, the warp strings z and the bias threads B. They are then secured to a thread securing member 5a shown in FIG. 3. The ends of the wefts x are fed out from weft beams (not shown) and are inserted in the weft rapier 18. They are then secured to the thread securing member 5a provided at the lower portion of the supporting member 5. Through the above procedure, the preparation for the weaving operation is completed. In this condition, the supporting member 5 is disposed near the cloth fell frame 4, and the weft rapier 18 at the lowered position.

If the fact that the thread density is low at the portion between the metal bushing 1 and the warp-string insertion starting face becomes a problem, multiple layers of auxiliary wefts x' may be manually inserted zigzag between layers of warp strings z or between the layer of bias threads B and the layer of warp strings z, as shown in FIG. 2.

Figure 9A:
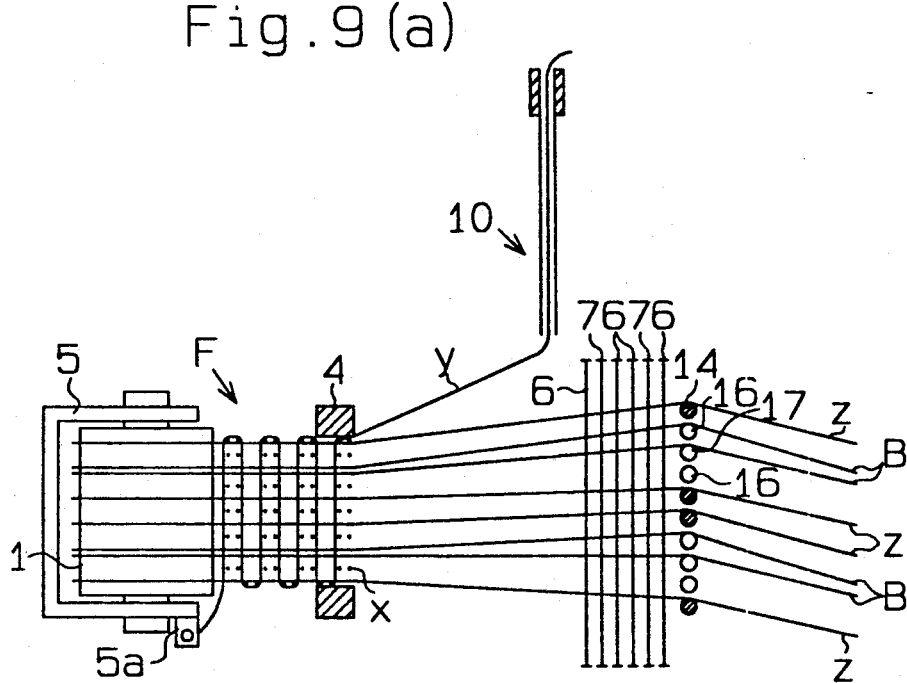
FIG. 9 (a) to (f) are schematic side elevational views illustrating a weaving operation.
Figure 9B:
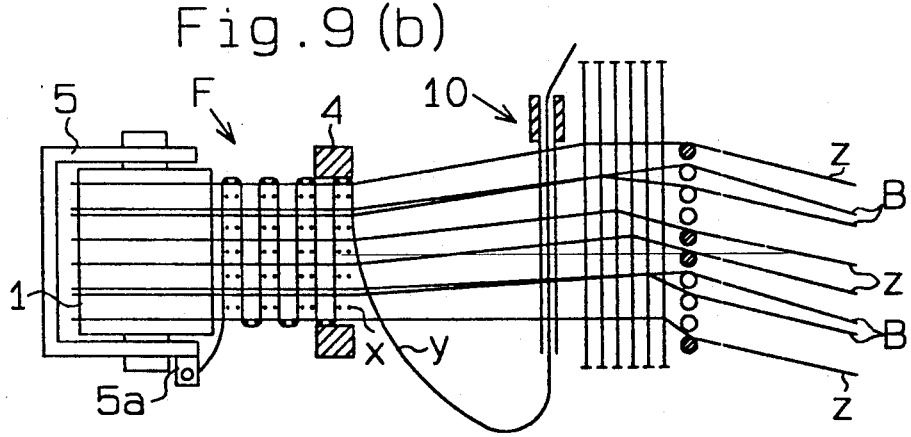

FIG. 9(a) illustrates a condition after completion of the fourth insertion of the wefts x of the three-dimensional fabric F by the weft rapier 18. In this condition, the vertical thread rapier 10 is disposed at its lifted position while the warp shedding devices 6 and the bias thread shedding devices 7 are all disposed at the respective lowered positions. (The engagement of the bias threads with the screw shafts 16 and 17 is simplified in the illustration.) In the condition wherein the bias thread shedding devices 7 are disposed at their lowered positions, the guide rods 8a of each of the bias thread shedding devices 7 are disposed at positions at which they are not engaged with the bias thread B inserted between the guide rod pair 8a. In this condition, the bias thread feeding device 15 is driven in such a manner as described earlier, and each bias thread B is moved by one pitch P in the widthwise direction of the three-dimensional fabric. Subsequently, as shown in FIG. 9(b), all of the warp shedding devices 6 and the bias thread shedding devices 7 are disposed at their lifted positions while the vertical thread rapier 10 is moved downward so that a vertical thread is inserted between each pair of adjacent columns of the warp strings z. Thereafter, each of the pipes 10a of the vertical thread rapier 10 is inserted, as shown in FIG. 4, between the bias threads to the rear of an intersecting portion of the bias threads disposed in a mutually intersecting condition, i.e., adjacent to the bias thread shedding devices 7.

Figure 9C:
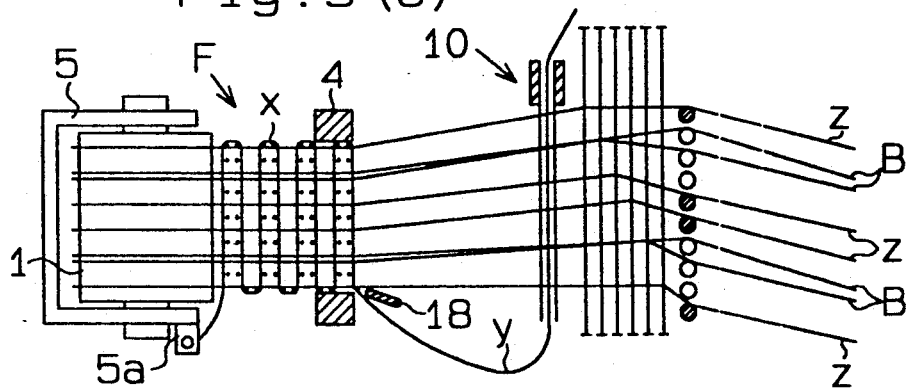
Figure 9:
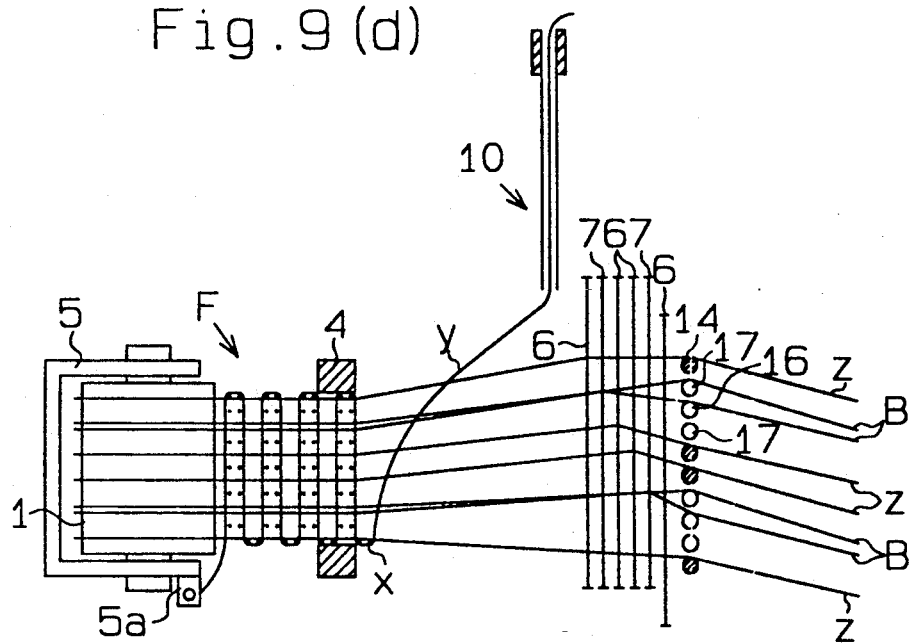
Figure 9:
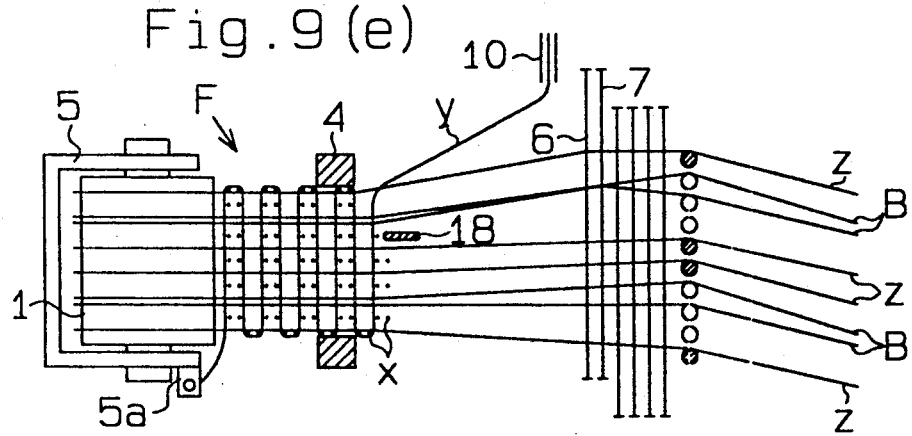
Figure 9:
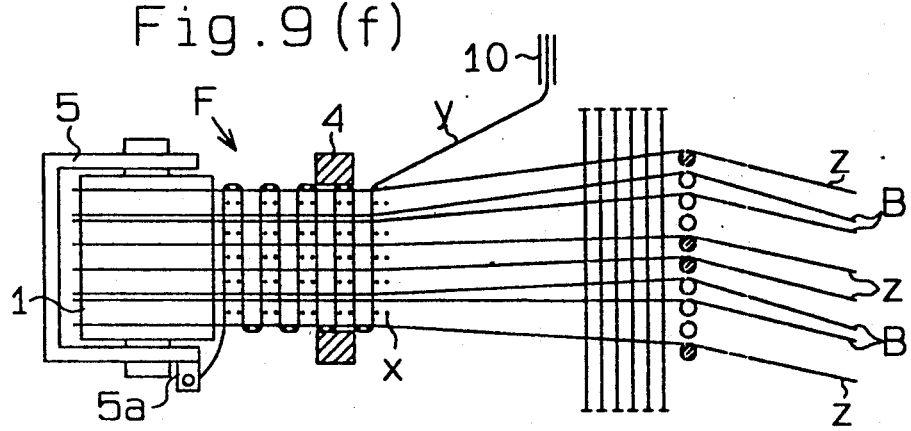

Subsequently, a weft x is inserted between a warp z at the lowermost stage and the vertical thread y by the weft rapier 18. Since the vertical thread rapier 10 is put apart from the cloth fell position, the vertical thread y is not disposed perpendicular to the warp z at the cloth fell position, but is positioned apart from the cloth fell position, by the downward movement of the vertical thread rapier 10 alone. However, the vertical thread y is disposed perpendicular to the warp z at the cloth fell position by the insertion of the weft x in the lowermost stage as shown in FIG. 9(c). It is to be noted that, before the insertion of the weft x is performed, beating may be performed to move the vertical thread y toward the cloth fell side.

Subsequently, the vertical thread rapier 10 is moved to the lifted position so that the vertical thread y is folded back upwardly. Then, the warp shedding devices 6 and the bias thread shedding devices 7 are disposed successively to their lowered positions from the side remote from the cloth fell frame 4 to form a shed, and the weft x is inserted into the shed by the weft rapier 18. When the vertical thread rapier 10 is moved to the lifted position, the vertical thread y extending from the vertical thread rapier 10 to the cloth fell is disposed obliquely with respect to the cloth fell as shown in FIG. 9(d). As the insertion of the weft x is performed by the weft rapier 18, however, the vertical thread y is successively disposed at a position immediately close to the cloth fell, as shown in FIGS. 9(e) and (f). After the condition shown in FIG. 9(f) is provided as a result of completion of insertion of the weft x into all of the stages, the supporting member 5 is moved so that the three-dimensional fabric F is moved by one pitch until one end thereof is put into the condition shown in FIG. 9(a). Thereafter, a similar sequence of operations is repeated so that the three-dimensional fabric F having substantially the same structure as the one shown in FIG. 1 is woven.

According to this weaving method, a fabric is formed in such a way that with the warp strings z and bias threads B wound in a folded manner around the metal bushing 1, the warp strings z and bias threads B are secured to the supporting member 5 to be stretched. This can permit the metal bushing 1 to be woven into the fabric without cutting threads that constitute the fabric.

Further, according to this weaving method, a three-dimensional fabric is formed by a simple operation of repeating the cycle of the insertion of the wefts x and the vertical threads y and the movement of the bias threads B by a predetermined pitch in the widthwise direction of the fabric. This method is therefore suitable for mechanical mass production of three-dimensional fabrics.

Second Embodiment

The second embodiment will now be described referring to FIGS. 10 to 14. This embodiment differs significantly from the first embodiment in how to form a three-dimensional fabric. By the method of weaving a three-dimensional fabric according to the second embodiment, the metal bushing 1 is disposed at a predetermined position on a base plate 19 having a shape corresponding to the outline of the desired three-dimensional fabric, and many pins 20 for regulating the alignment of threads are provided upright perpendicularly on the base plate 19. The warp strings z, the bias threads B or the wefts x are arranged between the pins 20, forming a warp layer, a bias thread layer or a weft layer.

Figure 10:
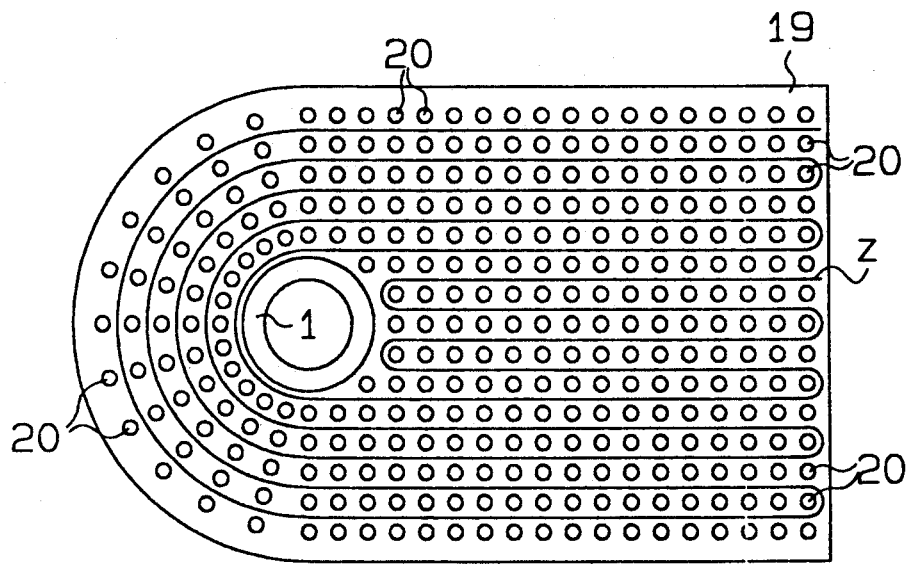
FIG. 10 is a schematic plan view illustrating how warp strings are arranged according to the second embodiment.
Figure 11:
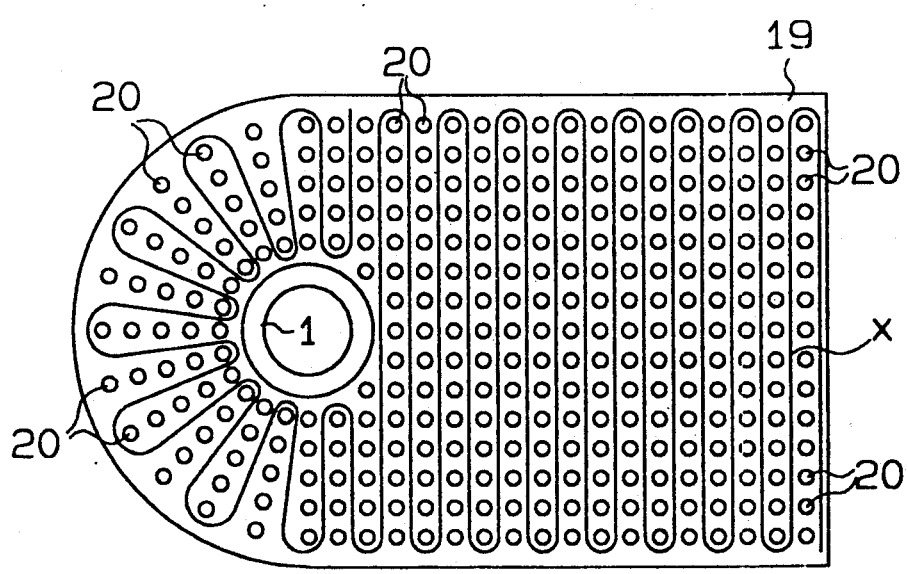
FIG. 11 is a schematic plan view illustrating how wefts are arranged.
Figure 12:
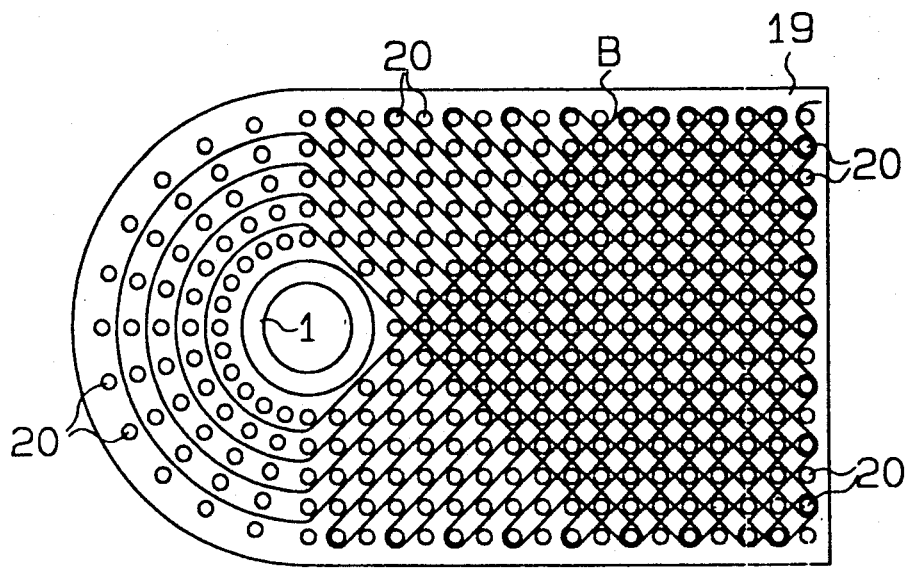
FIG. 12 is a schematic plan view illustrating how bias threads are arranged.
Figure 13:
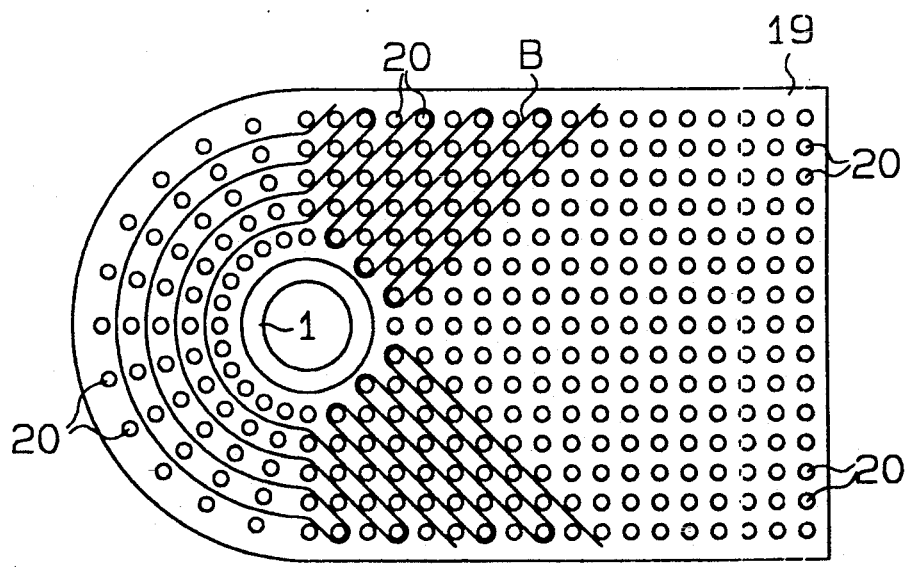
FIG. 13 is a schematic plan view also illustrating how bias threads are arranged.

The warp layer is formed by arranging the warp strings z so that they are folded back along the base plate 19 and along the periphery of the metal bushing 1, as shown in FIG. 10, for example. The weft layer is formed by arranging the wefts x so that they are folded back to be perpendicular to the warp strings z, as shown in FIG. 11, for example. The threads extending from the wefts x are arranged to run radially outward from the metal bushing 1 around the metal bushing 1 so as to be perpendicular to the warp strings z. Of course, the design could be readily modified so that strings other than the wefts x can be linked with the radial-extending bushing threads. The bias thread layer is formed by arranging the bias threads B so that they are folded back in the direction of forming 45 degrees relative to the lengthwise direction of the base plate 19 and along the periphery of the metal bushing 1, as shown in FIG. 12. In this case, the portion of the bias thread layer which is folded back has two layers while the portion before the folding has a single layer. To make the entire portion of the bias threads B become two layers, additional bias threads B are arranged as shown in FIG. 13, thus forming a couple of uniform two-layered bias thread layers.

Figure 14:
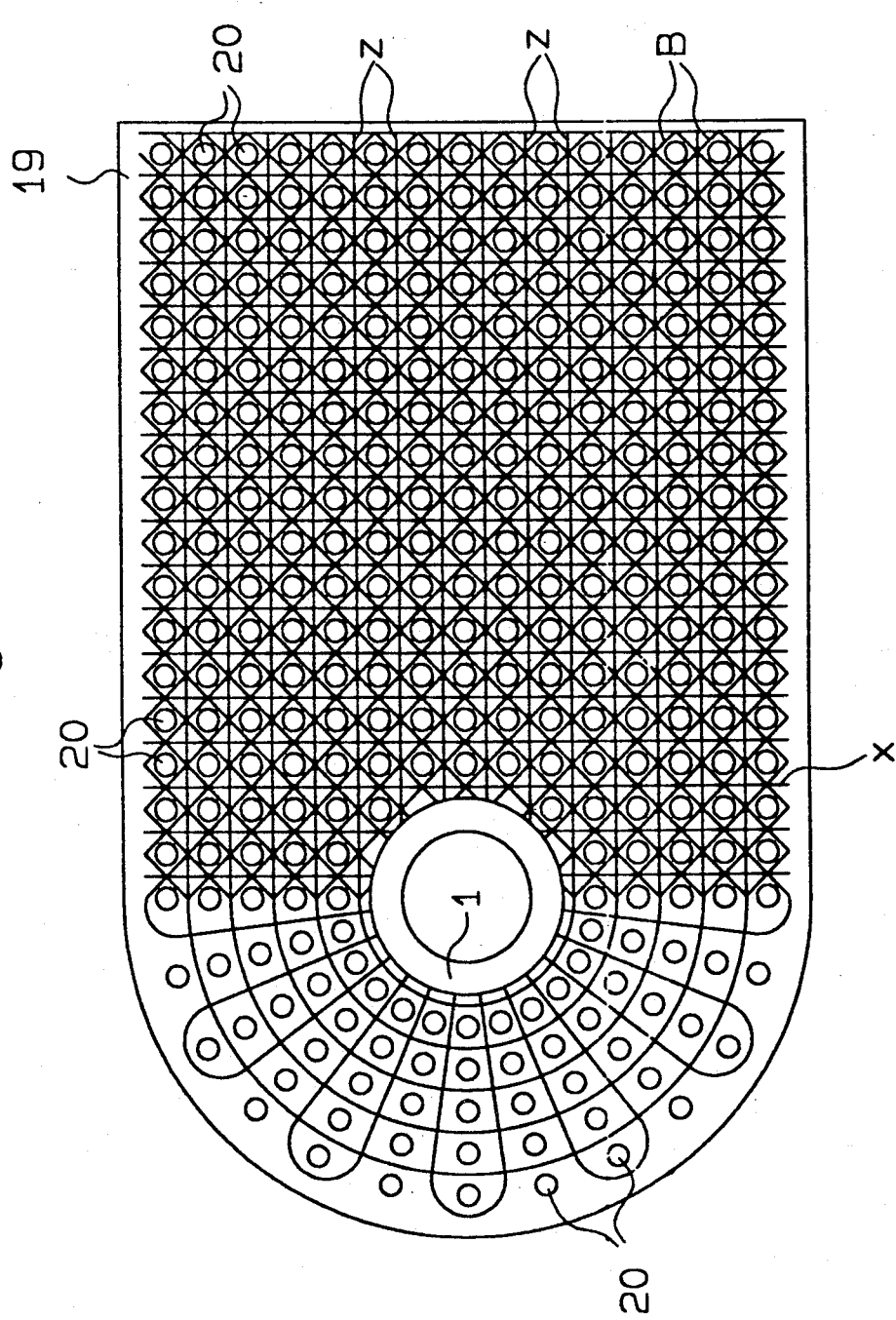
FIG. 14 is a schematic plan view illustrating how the individual layers of strings and threads are arranged.

Putting the individual layers on one another yields the condition as shown in FIG. 14. It is better that the folding-back positions for the radial-directional threads at the inner and outer peripheries be shifted layer by layer to provide an evenly-layered structure. After the necessary number of the above-mentioned layers are laminated in accordance with the magnitude, the direction, etc. of the loads that are expected to be applied to the coupling member, the pins 20 are replaced with the vertical threads (not shown) to couple the individual layers, thus providing a three-dimensional fabric.

The following are possible ways of replacing the pins 20 with the vertical threads.

(1) While the pin 20 is pushed out, the tip of the vertical thread is inserted into the gap formed by the pin, and is moved to the next pin 20 in one side of the fabric, resulting the zigzag replacement.

(2) While the pin 20 is pushed out, the vertical thread is inserted in a loop form in the pin-made gap and a selvage thread is inserted in the loop portion to prevent thread loosening.

The pine may be hollow narrow pipes, solid rods or other type, as long as they ensure easy replacement. Pipes instead of the pins 20 may be provided upright on the base plate, so that after a predetermined number of the warp layer, bias thread layer and weft layer are laminated, the vertical threads are inserted in the pipes to weave the pipes also into the three-dimensional fabric.

The thus-formed three-dimensional fabric is impregnated with a resin to be a composite. When there are threads (radial-directional threads) arranged to be folded back in the radial direction to the metal bushing 1 according to this embodiment, it is necessary to provide some clearance between the metal bushing 1 and the threads. This clearance becomes a resin layer in the composite. If the resin layer is thick, the fabric may easily be damaged. To prevent this shortcoming, the metal bushing 1 may be replaced with a metal bushing with a smaller clearance after aligning the individual threads, and the resultant fabric may then be impregnated with a resin. Alternately, the metal bushing 1 may be removed at the time the threads are aligned, pins may be arranged at the periphery of the metal bushing to facilitate the thread alignment, and the pins may be replaced with the metal bushing 1 after the thread alignment is completed. To firmly integrate the individual threads arranged around the metal bushing 1 with respect to the metal bushing 1, many holes may be formed in the metal bushing 1 to allow the radial-directional threads to be folded back, so that the radial-directional threads are inserted in a folded manner in the holes. In this case, the metal bushing 1 used at the time the individual threads are arranged is also used directly in the composite. These holes are formed in such a way that part of the radial-directional threads folded back do not protrude inside the metal bushing 1 and the folded portion will not be damaged.

The composite formed from the three-dimensional fabric which is made in the above-described manner and is impregnated with a resin, also has an improved strength against the compressive loads as per the first embodiment. Since the three-dimensional fabric according to the second embodiment has threads arranged perpendicular to the outer surface of the metal bushing 1 and threads arranged in the vertical direction of the fabric with respect to the warp strings z and the bias threads B arranged around the metal bushing 1, the portion surrounding the metal bushing 1 becomes stronger. According to the weaving method of the second embodiment, a three-dimensional fabric of the desired shape can be formed relatively easily by using the base plate 19 whose shape corresponds to the shape of the fabric even if the shape of the fabric supporting the metal bushing 1 is complicated or the fabric includes multiple metal bushings 1.

Third Embodiment

Figure 15:
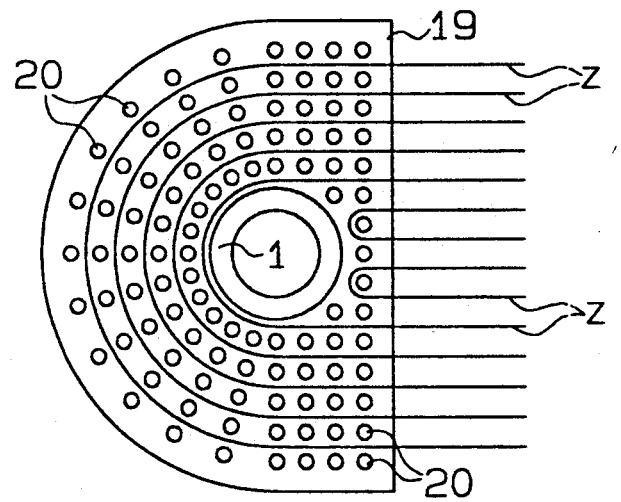
FIG. 15 is a schematic plan view showing how warp strings are arranged around a metal bushing according to the third embodiment.
Figure 16:
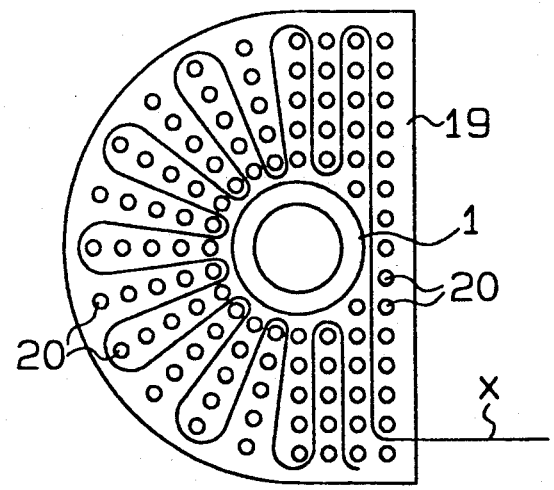
FIG. 16 is a schematic plan view showing how wefts are arranged around a metal bushing.

The third embodiment will now be described referring to FIGS. 15 and 16. According to this embodiment, the three-dimensional fabric weaving machine similar to the one used in the first embodiment will be used to form the body of a three-dimensional fabric, and the pins 20 as used in the second embodiment are likewise used to set the warp strings z, bias threads B and the like to the metal bushing 1. To describe in detail, the pins 20 are provided upright around the metal bushing 1 disposed on the base plate 19, and the warp strings z, the bias threads B and a thread which becomes the weft x are arranged between the pins 20. The warp strings z and the bias threads B are arranged as illustrated in FIG. 15 (only the warp strings z shown), while the thread serving to be the weft x is arranged as illustrated in FIG. 16. Since there needs a single weft x, if the threads arranged in the radial direction around the metal bushing 1 are so designed to be continuous to the weft x, there is only one layer of threads which are arranged in the radial direction around the metal bushing 1, unlike in the second embodiment. Accordingly, the portion to be woven by the three-dimensional fabric machine has a different thickness than the thread layer arranged around the metal bushing 1. To make these portions have the same thickness, the threads arranged in the radial direction around the metal bushing 1 may be arranged independently so that the number of the layers of the threads becomes the same as the weft x. In this case, it is better to change the folding positions at the inner and outer peripheries of the fabric layer by layer to thereby provide an evenly-woven fabric.

After aligning of the individual thread layers is completed, the pins 20 are replaced with the vertical threads and the metal bushing 1 is supported on the supporting member of the three-dimensional fabric weaving machine. Then, the individual threads are set to be taken up on the respective beams as per the first embodiment, and the body of the three-dimensional fabric is woven in this condition. The replacement of the pins 20 with the vertical threads may be performed after the fabric weaving is completed.

Figure 17:
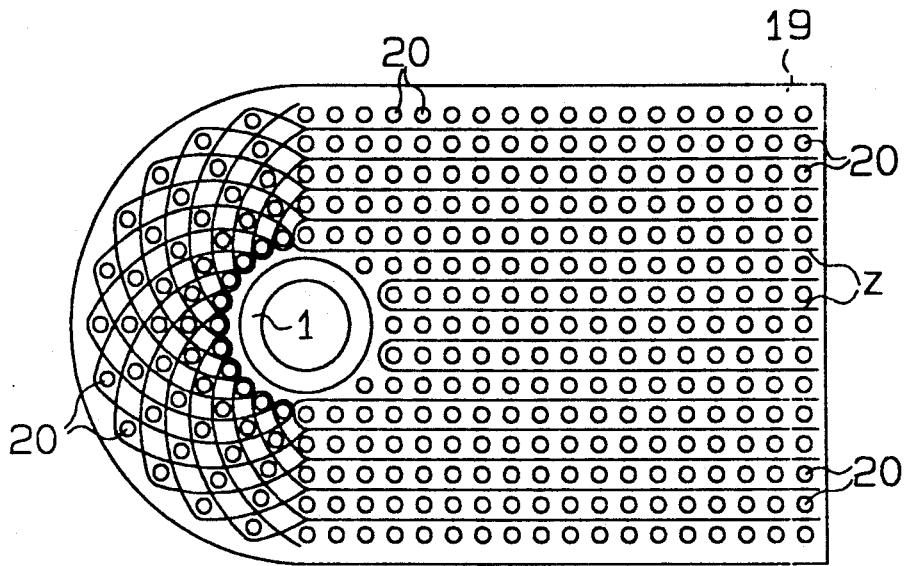
FIG. 17 is a schematic plan view showing how warp strings are arranged around a metal bushing according to a modification.
Figure 18A:
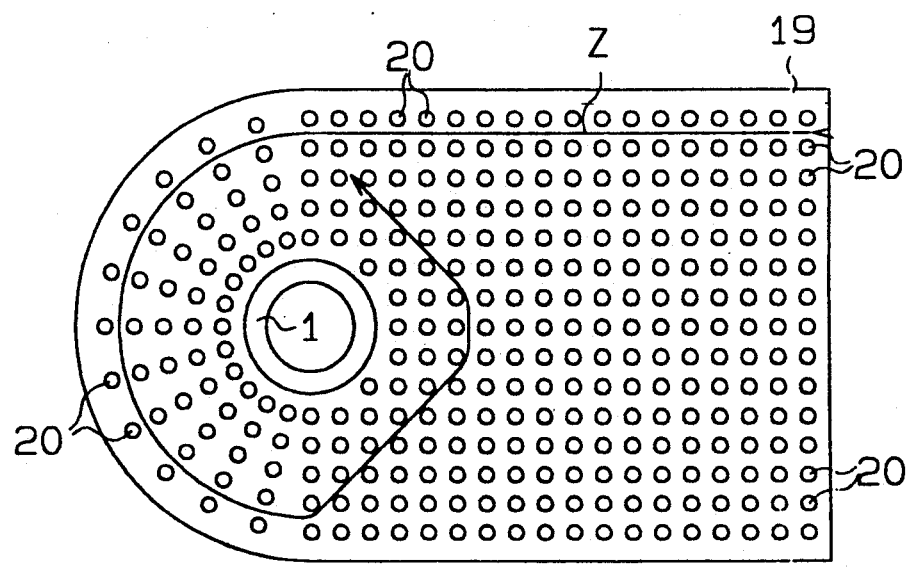
FIG. 18 (a) to (c) are schematic plan views showing how the warp strings are arranged.
Figure 18B:
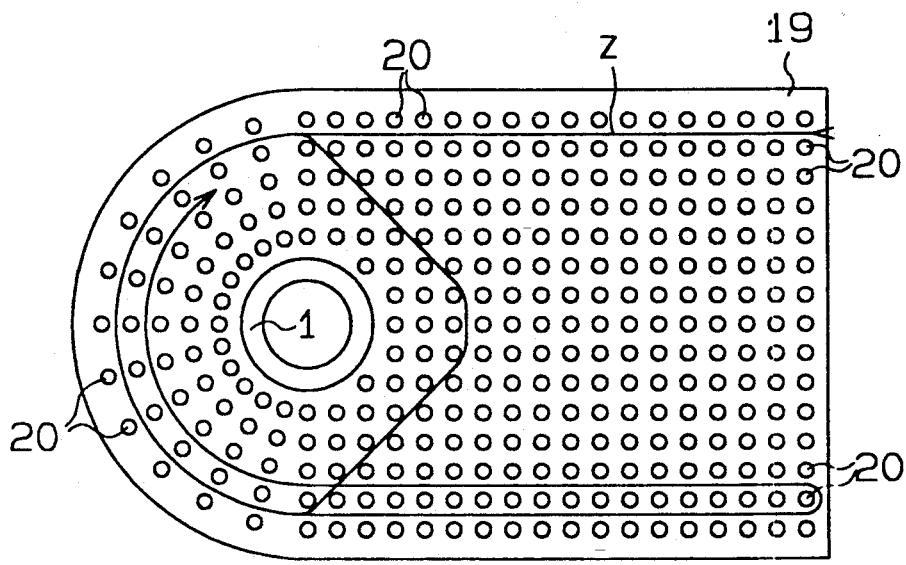
Figure 18C:
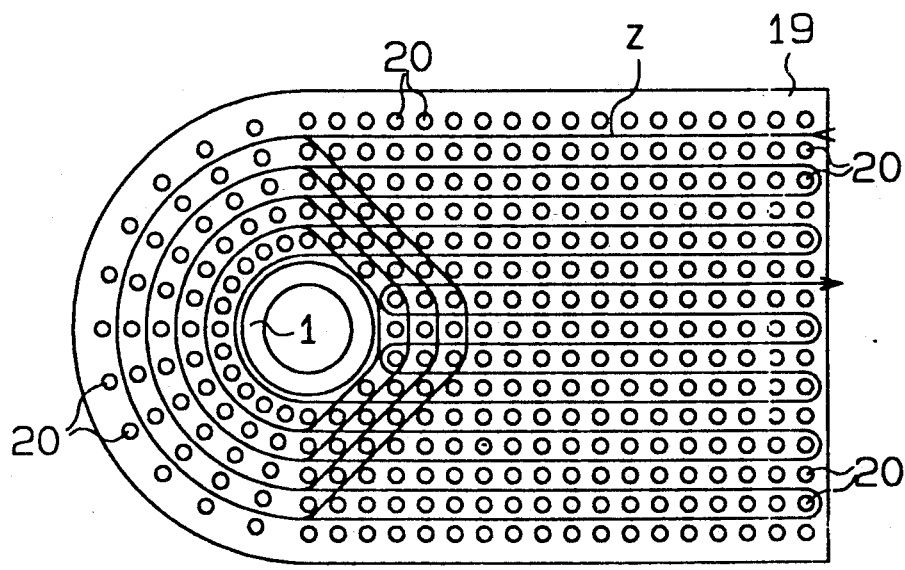
Figure 19:
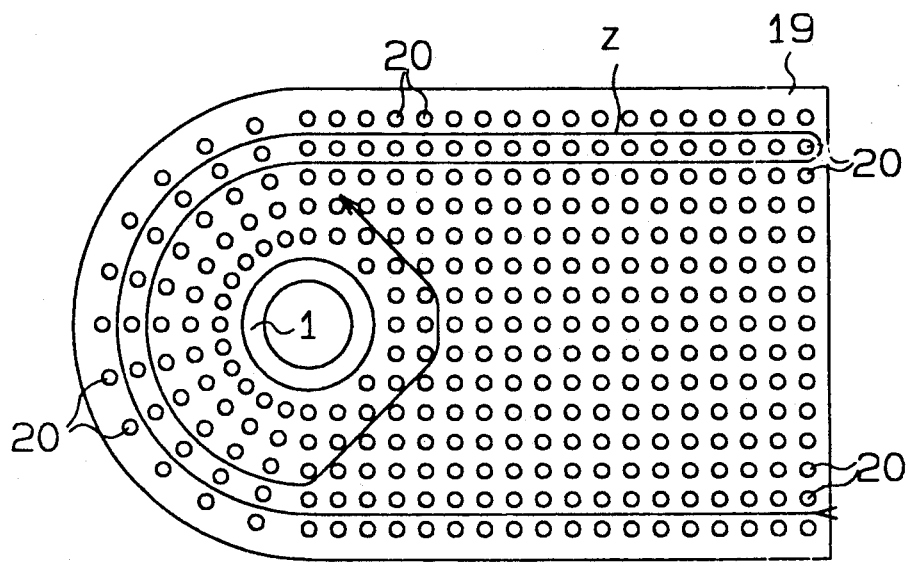
FIG. 19 (a) to (f) are schematic plan views showing how to thread the warp strings according to another modification.
Figure 19:
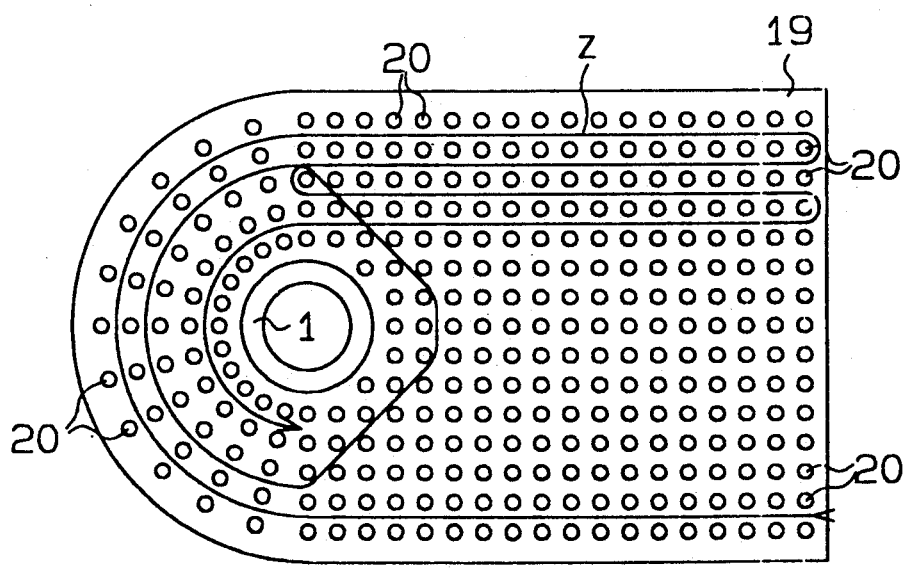
Figure 19C:
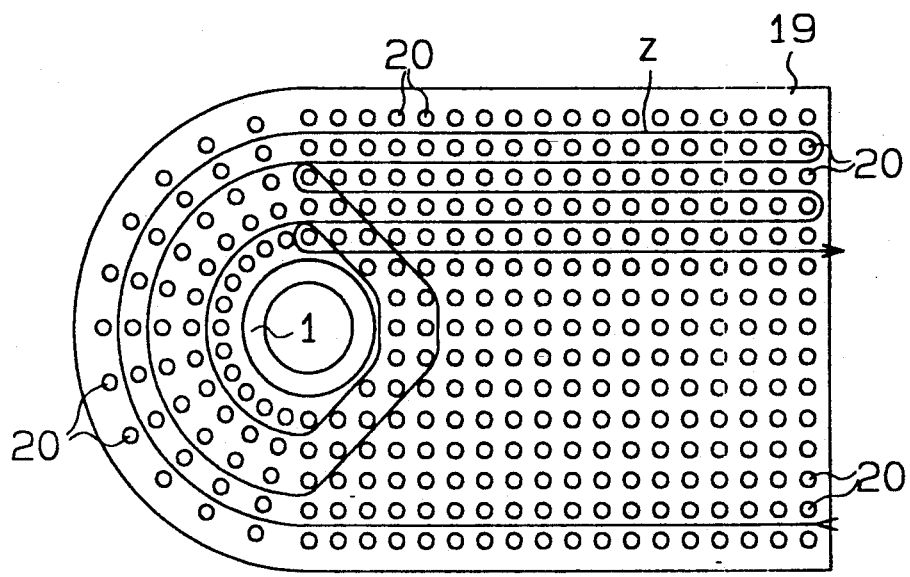
Figure 19D:
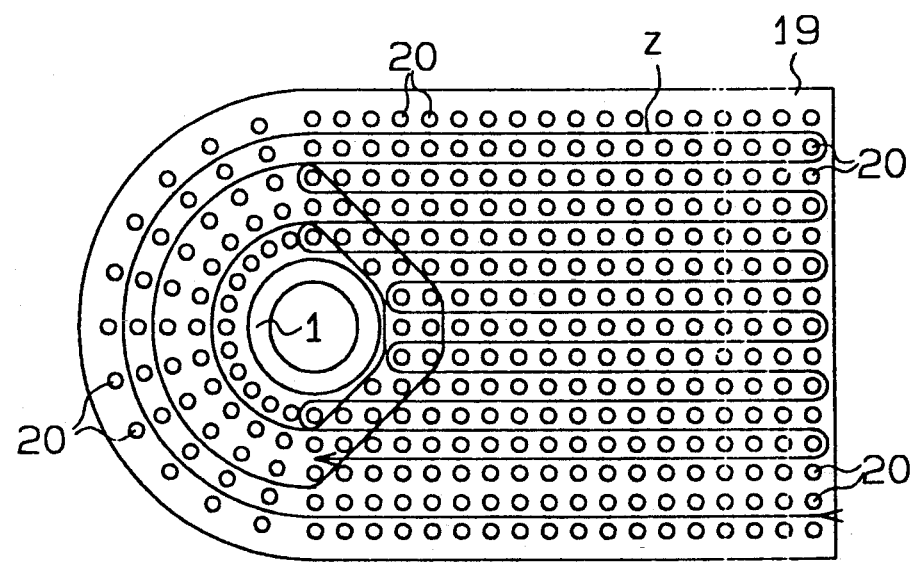
Figure 19E:
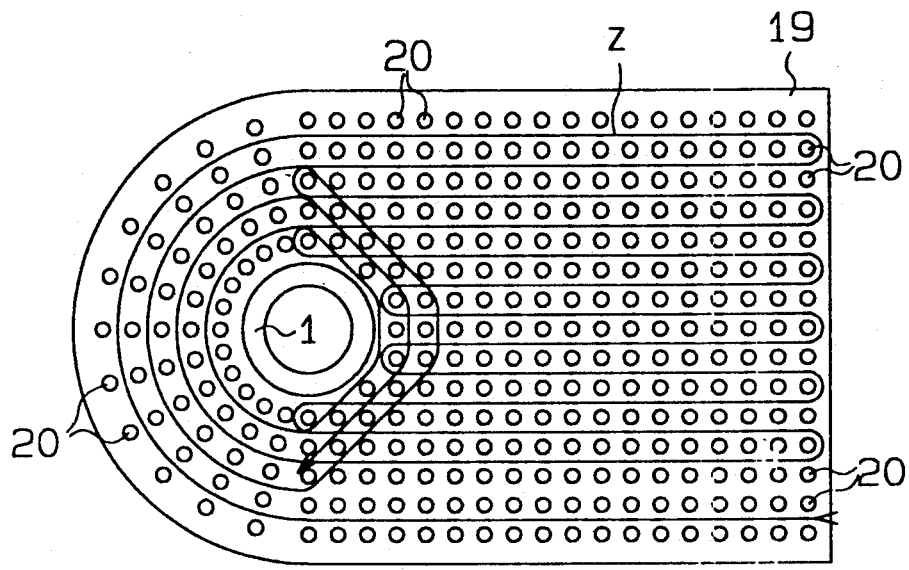
Figure 19F:
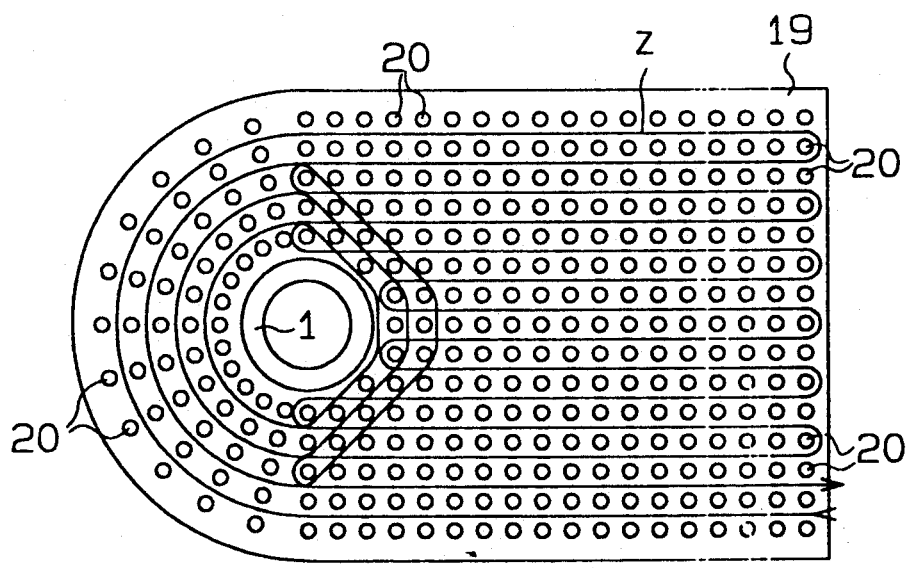
Figure 20:
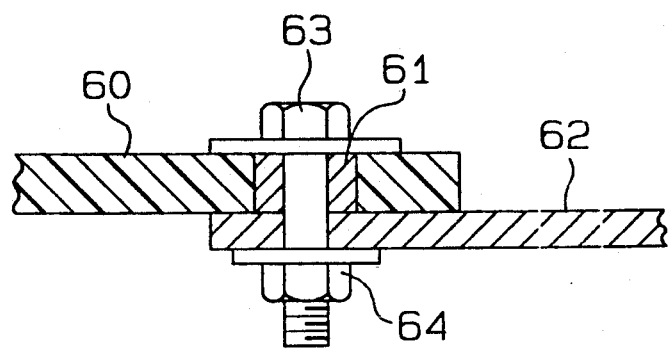
FIG. 20 is a side sectional elevational view showing how a composite is coupled to a structural material according to prior art.
Figure 21:
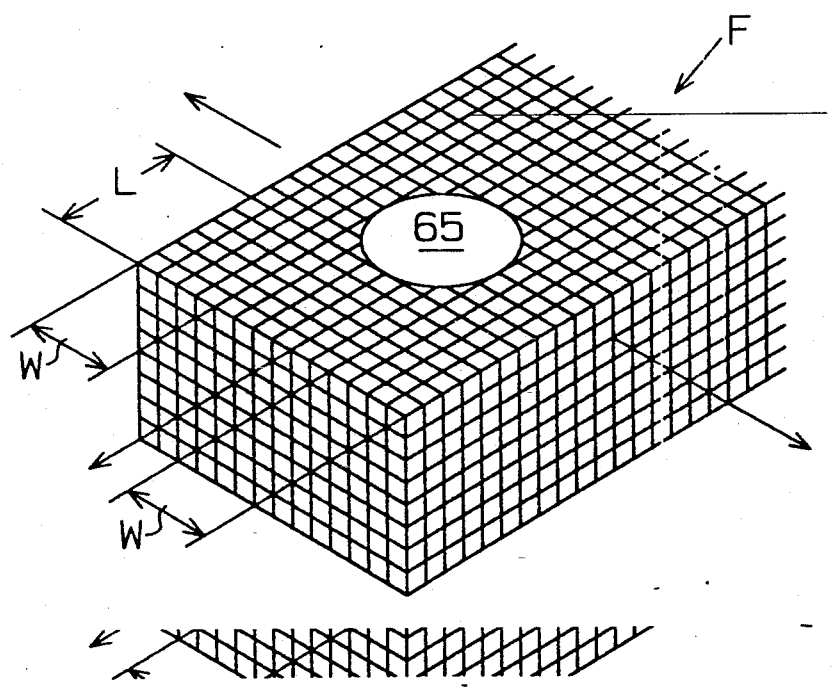
FIG. 21 is a schematic perspective view showing a hole formed in a three-dimensional fabric.

The present invention is not restricted to the above-described embodiments, but may be modified in other various manners without departing from the spirit and scope of the invention. For instance, while the warp strings z are simply arranged along the circumference of the metal bushing 1 according to the second embodiment, they may be arranged zigzag along the circumference of the metal bushing 1 as shown in FIG. 17. The latter case can enhance the function of evenly distributing the loads on the winding portion over the inner and outer layers and transferring the divided loads to the supporting portion, thus further improving the hardness (durability) of the fabric. Further, while the warp strings z and the bias threads B arranged around the metal bushing 1 are folded back as they circle around the metal bushing 1 a half turn, the warp string z may be arranged in the procedures shown in FIG. 18(a) to (c) so that part or all of the warp string z is wound completely around the metal bushing 1. Alternatively, though not illustrated, part or all of the bias threads B may be wound around the metal bushing 1 in a similar manner. Such a thread pattern permits effective transferring of the compressive loads applied to the metal bushing 1 to the whole composite, thus permitting the fabric to show considerable durability against the compressive loads that is required particularly of the coupling member. Although such a thread pattern increases the overlapping of thread layers around the metal bushing 1, making that portion thicker than the other portion of the fabric, the thickness can be adjusted by increasing the pressing force to compress the fabric in the vertical direction to flatten the threads, or restricting the distance of the insertion of the wefts x to a part of the width of the fabric or changing the distance of the insertion of the bias threads B.

Of the threads around the metal bushing 1, both of the threads arranged radially (radial-directional threads) and the threads arranged in the vertical direction (vertical threads) are not always necessary, but the presence of at least one of them can improve the strength around the metal bushing 1. If there are the radial-directional threads around the metal bushing 1, the vertical threads may be so arranged as to lie over the radial-directional threads or lie over the warp strings z or bias threads B arranged in the circumferential direction according to the second and third embodiments. If the radial-directional threads are not present around the metal bushing 1, the vertical threads can take only the latter pattern. To arrange the threads only in the radial direction, small holes may be formed in the outer surface of the metal bushing 1 so as to permit a rod of threads bundled together to be fitted in the hole to serve as the radial-directional threads. The rod may be formed by impregnating the roving of a raw material used for a three-dimensional fabric with a resin, and then putting the resultant structure into a die of a given shape. In this case, the cross-sectional shape of the rod is not limited to a circle.

To prevent the threads wound around the metal bushing 1 from shifting in the axial direction of the metal bushing 1, flanges may be provided at both end portions of the metal bushing 1, or a number of grooves may be formed in the outer surface of the metal bushing 1 along the circumference thereof to receive a part of the threads. Further, a thread insertion hole may be formed in part of the metal bushing 1 so that a three-dimensional fabric F is woven while a part of the warp strings z and bias threads B to be wound around the metal bushing 1 or a part of threads to be added at the weaving start point is inserted in that hole. Furthermore, the solid member woven in the three-dimensional fabric F is not restricted to have a cylindrical shape but a tubular-member having a triangle or rectangle section may be woven into the fabric. While multiple solid members instead of one may be woven into the fabric, if multiple solid members are present at one end portion of the three-dimensional fabric, the weaving method by the three-dimensional fabric weaving machine as done in the first embodiment and the method of using the pins 20 as done in the second embodiment are both applicable. If the solid members are present at both end portions of the fabric, the weaving method is restricted to that of the second embodiment wherein many pins 20 are provided upright on the base plate 19 and threads are arranged along the pins 20.

With the weaving method using the pins 20, the aforementioned rod made of the roving of a raw material used for a three-dimensional fabric may be used as each pin 20. With this arrangement, after the patterning of the warp strings z, bias threads B and wefts x is completed, the pins 20 are removed together with the fabric F from the base plate 19 and the entire resultant structure is subjected to a resin-impregnating process to be cured without replacing the pins 20 with the vertical threads. If the threads are arranged while the rod is used with the resin not completely cured, but semicured, and the curing of the resin in the rod progresses in the resin-impregnating and curing process in this case, the coupling between the fabric and the whole resin becomes firmer.

In addition, at the time a three-dimensional fabric is woven by the three-dimensional fabric weaving machine, the wefts x may be inserted not only into the end loop portions formed at the folding portions of the vertical threads y inserted in a folded manner between columns of the warp strings z, but also between the individual warp strings z and bias threads B, thereby increasing the density of the wefts x. Further, instead of using a single continuous thread as the wefts x, independent threads may be used at individual stages, or the vertical threads y and the wefts x may be inserted using a shuttle to thereby firmly form the selvage portion by folding the associated threads back. Furthermore, provided that there is at least one warp layer and one couple of the bias thread layers, the number of the warp layers z and the number of the sets of the bias thread layers may be changed arbitrarily.

An in-plane three-axis, multiple thread layers each made from the warp strings z and the bias threads B without using the wefts x may be laminated one on another and then coupled together in the vertical direction by the vertical threads y to provide a four-axis three-dimensional fabric. For such a four-axis three-dimensional fabric, arranging the warp strings z and the bias threads B constituting the in-plane three-axis fabric so as to cross each other at an angle of 60 degrees can easily improve the fabric filling factor as compared with a five-axis three-dimensional fabric. This can allow the bias threads B to be thicker, which improves the strength of the three-dimensional fabric used as a composite against the oblique force applied thereto and increasing the strength of the fabric against the vertical shearing compression.

What is claimed is:

1. A three-dimensional fabric comprising:
   a solid member;
   a multiplicity of warp strings arranged in a plurality of layers that extend in a lengthwise direction of the fabric, at least some of the warp strings being wrapped around the solid member;
   a multiplicity of bias threads arranged in at least one symmetrical pair of bias thread layers, the bias threads each being inclined relative to the lengthwise direction of the fabric and the layers in said bias layer pair being symmetrically arranged relative to the lengthwise direction of the fabric, at least some of the bias threads being wrapped around the solid member; and
   a plurality of vertical threads arranged substantially perpendicular relative to the warp strings and the bias thread layers, for coupling the layers of the warp strings and the bias threads.

2. A three-dimensional fabric comprising:
   a solid member;
   a multiplicity of warp strings arranged in a plurality of layers that extend in a lengthwise direction of the fabric, at least some of the warp strings being wrapped around the solid member;
   a multiplicity of bias threads arranged in at least one symmetrical pair of bias thread layers, the bias threads each being inclined relative to the lengthwise direction of the fabric and the layers in said bias layer pair being symmetrically arranged relative to the lengthwise direction of the fabric, at least some of the bias threads being wrapped around the solid member;
   a plurality of vertical threads arranged substantially perpendicular relative to the warp strings and the bias thread layers, for coupling the layers of the warp strings and the bias threads; and
   radial threads that extend in a direction substantially perpendicular to an outer surface of the solid member and between selected bias and warp string that are wrapped about the solid member.

3. A three-dimensional fabric comprising:
   a solid member;
   a multiplicity of warp strings arranged in a plurality of layers that extend in a lengthwise direction of the fabric, at least some of the warp strings being wrapped around the solid member;
   a multiplicity of bias threads arranged in at least one symmetrical pair of bias thread layers, the bias threads each being inclined relative to the lengthwise direction of the fabric and the layers in said bias layer pair being symmetrically arranged relative to the lengthwise direction of the fabric, at least some of the bias threads being wrapped around the solid member;
   a plurality of vertical threads arranged substantially perpendicular relative to the warp strings and the bias thread layers, for coupling the layers of the warp strings and the bias threads, and
   a plurality of vertically extending threads that extend substantially perpendicular to and between selected bias and warp string that are wrapped about the solid member.

4. A three-dimensional fabric according to claim 1, wherein the warp strings and the bias threads are wound around the whole outer surface of the solid member.

* * * * *